May 14, 1963   C. J. JANKOWSKI   3,089,531
TIRE BEAD AND MANUFACTURE THEREOF
Filed Feb. 6, 1958
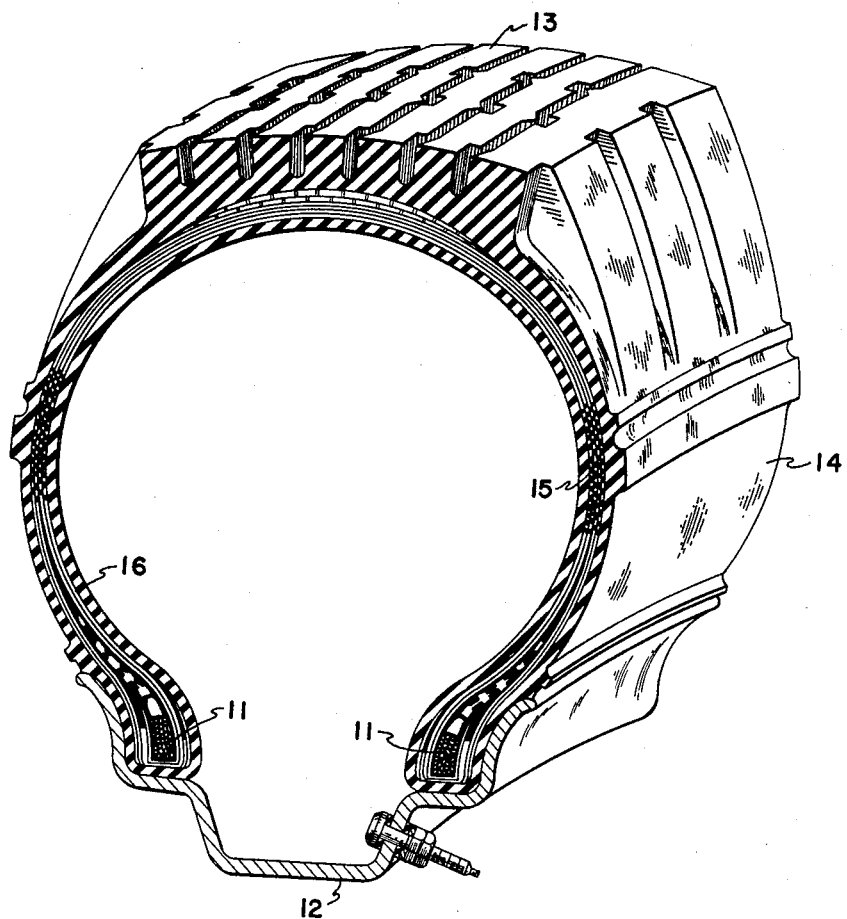
Conrad J. Jankowski   Inventor
By W. H. Smyers   Attorney

United States Patent Office 3,089,531
Patented May 14, 1963

3,089,531
TIRE BEAD AND MANUFACTURE THEREOF
Conrad J. Jankowski, Bayonne, N.J., assignor to Esso Research and Engineering Company, a corporation of Delaware
Filed Feb. 6, 1958, Ser. No. 713,605
4 Claims. (Cl. 152—330)

The present invention relates to tire beads and manufacture thereof, or more broadly to articles comprising a metal, particularly brass-plated steel, having special butyl rubber compositions adhered thereto.

The term "bead portion" as used herein denotes the combination of bead wire, rubber insulation, fabric, wrapping and flipper strips. The chief function of the bead is to hold the casing on the rim by preventing the beaded edges from stretching. Without the bead, pressure of the air inside of the tire would cause the edges of the casing to stretch until they slipped over the rim flanges. Thus the bead by reacting to the pressure inside the tire, forms, together with the other elements of the bead edge, a rigid, practically inextensive foundation supporting the tire load and, in turn, transferring this load to the flanged edges of the rim. Moreover, the bead serves as the foundation on which the tire is built. It is evident, therefore, that the insulating rubber composition in the bead portion must consist of a semi-hard rubber and having a Shore A hardness of about 70 to 95.

Heretofore beads made with low unsaturation isoolefin-multiolefin polymers, called butyl rubber, tended to fail when placed under severe stress conditions. While these beads are satisfactory for ordinary use, there is some danger that they may fail after sustained use, particularly where the tire is recapped and driven another 10,000–20,000 miles. One of the chief causes of this type of failure is lack of suitable adhesion or bonding between the bead wire and the butyl rubber.

It has now been found that superior bead performance, and more broadly superior adhesion of butyl rubber to metals, particularly brass-plated steel wire as conventionally used in tire beads, is obtained if a minor proportion of a chloro-sulfonated polyethylene is homogeneously compounded with the butyl rubber used in the bead composition.

The invention will be best understood from the following description wherein reference is made to the drawing in which the single FIGURE is a vertical section of a pneumatic tubeless tire containing a bead section in accordance with the present invention.

Butyl rubber generally comprises a copolymer of a major proportion of an olefin, such as relatively low molecular weight isoolefin (e.g., isobutylene) and a minor proportion of a multiolefin, preferably having a ratio of the isoolefin to the multiolefin of about 90 to 99.5% to about 10 to 0.5% by weight, respectively. Copolymers of the above general type, especially where the copolymer is about 85% to about 99.5% of a $C_4$ to $C_7$ isoolefin, such as isobutylene, with about 15 to 0.5% of a multiolefin of about 4 to 14 carbon atoms, are commonly known in the literature as GR–I rubber and, for example, is referred to as butyl rubber in the textbook "Synthetic Rubber" by G. S. Whitby (1954 edition), pages 608 to 609. The preparation of butyl type rubber is described in U.S. Patent No. 2,356,128, and elsewhere in the literature.

In general, butyl rubber comprises the copolymerization product of a $C_4$ to $C_7$ isoolefin (preferably isobutylene) with a $C_4$ to $C_{10}$ conjugated multiolefin, such as isoprene, butadiene, dimethyl butadiene, piperylene, etc. The copolymer of isobutylene and isoprene is preferred. The polymer has a Staudinger molecular weight within the range of about 20,000 to 100,000. The viscosity average molecular weight is above about 300,000 up to about 1,500,00. The Wijs iodine number is in the range of about .5 to 50, preferably in the range of about 1 to 20. The above copolymer, when cured has a good elastic limit, tensile strength, abrasion resistance and flexure resistance.

The chlorosulfonated polyethylene, or more broadly the halo-sulfonated polymer of an aliphatic olefin, to be used according to the present invention, may be prepared according to Patent 2,212,786. The polymer should be a normally solid polymer of an olefin of about 2–5 carbon atoms, e.g., ethylene, propylene, isobutylene, etc., and should have a molecular weight of at least 1,000, and preferably at least 5,000, e.g., 10,000; 20,000; or up to 40,000 or higher. The preparation of the halo-sulfonated derivatives of these hydrocarbon starting materials can be carried out in various ways. One of the simplest is to dissolve the polymer in a suitable solvent such as carbon tetrachloride, and to treat the resulting solution with a mixture of gaseous sulfur dioxide and chlorine. Bromine may also be used as halogen. Sulfonyl chloride, $SO_2Cl$, or sulfuryl chloride $SO_2Cl_2$, may also be used. In using $SO_2$ and $Cl_2$, it is preferable to use about 3–6 parts of $SO_2$ per 1 part of $Cl_2$. The resulting chlorosulfonated polymer contains about 0.1 to 10%, preferably about 0.3–8% of sulfur, and about 10–60%, preferably about 15–50% of chlorine.

A specific example of a suitable chlorosulfonated polyethylene is one made from a commercial polyethylene having a mol. wt. of about 20,000, and chlorosulfonated to about 29% Cl and 1.25% S.

The amount of such halo-sulfonated polymer to be used in the butyl rubber blend for bonding to metal, should be about 5–40%, preferably about 10–30%.

In addition to the above mentioned two main constituents of the bead composition, namely, the butyl rubber and chloro-sulfonated polyethylene, other compounding ingredients may be used, such as various types of carbon black and mineral fillers, plasticizers and softeners, such as resins, mineral oil, etc., metal oxide such as zinc oxide, magnesia, etc., as well as various curatives such as sulfur and accelerators, e.g., various alkyl thiuram sulfides, benzothiazyl disulfide, mercaptobenzo-thiazole, etc., or other known vulcanizing ingredients.

In carrying out the invention, the butyl rubber halosulfonated polymer, and curatives, optionally with additional compounding agents, are mixed together to a homogeneous plastic mass, as can be done satisfactorily on a pair of steel rolls as in the conventional rubber mill, and the resulting composition is shaped into the desired bead form, preferably using brass-plated steel wire, then built up with the other parts of the tire, including the main horseshoe-shaped carcass, tread, and outer sidewalls, and then the whole assembly is vulcanized by heating at about 250–400° F. for about 60 minutes to 10 minutes.

The single FIGURE in the accompanying drawing shows a pneumatic tubeless tire which comprises a hollow toroidal type member which is substantially U-shaped in cross section by virtue of an open portion which extends around the inner periphery of the member. In otherwords, the tire is of a tubular structure which has a cross section in the form of an open-bellied body with spaced terminal portions to define a member generally resembling a horseshoe. The terminal portions constitute the bead portion 11 of the tire inside of which are a plurality of bead wires adhesively embedded and molded in a semi-hard butyl rubber composition prepared according to the present invention. The outer surface of the bead portion is advantageously formed into an airsealing means, such as a plurality of ribs (not shown) to aid in adhesion to rim 12 when the tire is inflated.

The outer surface of the tire also includes a tread area 13 and sidewalls 14. The open portion of the horseshoe shaped tire faces that portion of the innner circumference of the tire which is adjacent the tread area 13 of the tire. The remaining construction of the tire may vary according to conventional fabrication, but in general, the tire is a multi-layered type structure with an outer layer as set forth above. The layer next adjacent the outer layer generally comprises a carcass 15 which includes a rubber which has incorporated therein a fabric composed of a plurality of cotton, rayon, or nylon cords. The tire may also include an inner lining 16 made from rubber. The inner lining must be substantially impermeable to air.

In order to more fully illustrate the invention, the following experimental data are given.

Two butyl rubber bead compositions were prepared with the ingredients set forth in the table here below, using in one case a mixture of 80 parts of butyl rubber with 20 parts of Hypalon 20, which is a commercially available chlorosulfonated polyethylene having 29% Cl and 1.25% S, and in the other (control) composition, 100% of butyl rubber, i.e., with no Hypalon. The amounts of carbon black, modifiers, and curatines, were adjusted to give essentially comparable results as to extrusion and curing properties. Then both compositions were used for making conventional tests for determining the adhesion of the composition to brass-plated steel bead wire. The results of the physical tests on the compositions per se, i.e., tensile, modulus, elongation and Shore hardness, and the bead wire adhesion test are all shown in the table here below.

TABLE

| Compound No. | I | II |
|---|---|---|
| Enjay Butyl 215 [1] | 100 | 80 |
| Hypalon 20 | | 20 |
| SAF Black | 80 | 20 |
| MPC Black | | 55 |
| Necton 60 (mineral oil plasticizer) | 5 | 3 |
| Elastopar [2] | 1.5 | 1.0 |
| Stearic Acid | 5 | 1 |
| Zinc Oxide | 5 | 5 |
| Maglite K (MgO) | | 3 |
| Contogum B-3 (Hydrogenated Resin) | | 3 |
| Sulfur | 5 | 3.5 |
| Monex (Tetramethyl Thiuram Monosulfide) | 2 | |
| Altax (Benzothiazyl Disulfide) | 2 | |
| Tuads (Tetramethyl Thiuram Disulfide) | | 2 |
| Captax (Mercaptobenzothiazole) | | 1.5 |
| Tensile Strength, p.s.i.: | | |
| Cure 20' at 307° F | 2,087 | 1,795 |
| Cure 40' at 307° F | 2,565 | 1,790 |
| 100% Modulus, p.s.i.: | | |
| Cure 20' at 307° F | 602 | 1,271 |
| Cure 40' at 307° F | 694 | 1,496 |
| 300% Modulus, p.s.i.: | | |
| Cure 20' at 307° F | 1,689 | |
| Cure 40' at 307° F | 2,442 | |
| Elongation, Percent: | | |
| Cure 20' at 307° F | 438 | 192 |
| Cure 40' at 307° F | 320 | 146 |
| Shore "A" Hardness: | | |
| Cure 40' at 307° F | 90 | 95 |
| Adhesion to Brass-plated Steel Bead Wire [3]: | | |
| Cure 45' at 307° F.—# Pull/Inch Imbedded | 65 | 116 |

[1] Isobutylene-isoprene copolymer having about 1.5–1.9 mol. percent unsaturation, and an 8 min. Mooney value of about 40–50.
[2] N-nitroso-p-nitroso methyl aniline.
[3] Several sample wires are cured into a block of rubber and then pulled out, measuring the force required to do the latter.

The above data show that the butyl-Hypalon blend had an extremely surprisingly high adhesion to the brass-plated steel bead wire, i.e., 116 pounds, compared to only 65 for the corresponding butyl composition which did not contain any Hypalon. It is also noteworthy that although the Hypalon blend did not show quite as high tensile strength as the butyl control, the Hypalon blend showed about twice as high 100% modulus, thereby indicating excellent dynamic properties for cooperating with the high adhesion to the bead wire.

Thus, all properties necessary for improved bead performance are obtained when a butyl-chlorosulfonated polyethylene covulcanizate is used, namely, dynamic performance, higher adhesion to the wire, lower extension modulus, and applicability to all types of brass-plated bead wire.

In another test, using the same formulation for the butyl rubber composition containing the Hypalon, but using electro brass-plated steel wire, an even higher adhesion value of about 150 lbs./inch was obtained.

Other variations and modifications may be employed in the present invention without departing from the spirit of the invention or the scope of the appended claims.

What is claimed is:

1. A rubber tire having a bead portion comprising brass-plated steel bead wires embedded in a composition comprising about 60 to 95% of butyl rubber copolymer of about 85 to 99.5% of a $C_4$–$C_7$ isoolefin with about 15 to 0.5% of a $C_4$–$C_{10}$ conjugated multiolefin and about 40 to 5% of halosulfonated polyolefin selected from the group consisting of bromosulfonated polyolefin and chlorosulfonated polyolefin.

2. A rubber tire having all of its rubber parts made of butyl rubber, copolymer of about 85 to 99.5% of a $C_4$–$C_7$ isoolefin with about 15 to 0.5% of a $C_4$–$C_{10}$ conjugated multiolefin, and said tire having a bead portion comprising brass plated steel wires embedded in a composition comprising about 60 to 95% of the said butyl ruber copolymer and about 40 to 5% of halosulfonated polyolefin selected from the group consisting of bromosulfonated polyolefin and chlorosulfonated polyolefin.

3. The ruber tire of claim 2 in which the butyl rubber copolymer is a copolymer of isobutylene and isoprene and the halosulfonated polyolefin is chlorosulfonated polyethylene.

4. In the process of manufacturing butyl rubber copolymer of about 85 to 99.5% of a $C_4$–$C_7$ isoolefin with about 15 to 0.5% of a $C_4$–$C_{10}$ conjugated multiolefin tires having the said butyl rubber copolymer also in the bead portion thereof, the method of obtaining high adhesion between brass-plated steel bead wires and said butyl rubber copolymer in the bead portion, comprising compounding 5 to 40% of chlorosulfonated polyethylene into said butyl rubber before embedding the bead wires therein.

References Cited in the file of this patent

UNITED STATES PATENTS

| | | |
|---|---|---|
| 2,422,903 | Huston | June 24, 1947 |
| 2,441,945 | Frolich | May 25, 1948 |
| 2,563,113 | Hindin et al. | Aug. 7, 1951 |
| 2,566,384 | Tilton | Sept. 4, 1951 |
| 2,587,430 | Baldwin | Feb. 26, 1952 |
| 2,630,398 | Brooks et al. | Mar. 3, 1953 |
| 2,646,422 | Strain | July 21, 1953 |
| 2,711,986 | Strain et al. | June 28, 1955 |
| 2,791,258 | Peterson et al. | May 7, 1957 |
| 2,814,609 | Borunsky | Nov. 26, 1957 |
| 2,822,026 | Willis | Feb. 4, 1958 |
| 2,830,919 | Schatzel | Apr. 15, 1958 |
| 2,960,426 | O'Mahoney | Nov. 15, 1960 |

OTHER REFERENCES

Dupont Information bulletin, Hypalon S-2, No. X35, Aug. 8, 1952, pages 1–4.

Dupont Bulletin, "Hypalon," No. X-51, page 5, received by Patent Office May 4, 1953.

Dupont Information Bulletins, Hypalon S-2, No. X-32, pages 3, 11, and 14–16, and No. 53, page 4, both received in the Patent Office Sept. 21, 1953.